(12) United States Patent
Su et al.

(10) Patent No.: US 8,982,721 B2
(45) Date of Patent: Mar. 17, 2015

(54) METHOD AND APPARATUS FOR REPORTING CHANNEL STATE INFORMATION (CSI) BASED ON PHYSICAL UPLINK SHARED CHANNEL (PUSCH)

(75) Inventors: Xin Su, Beijing (CN); Deshan Miao, Beijing (CN); Ranran Zhang, Beijing (CN); Meifang Jing, Beijing (CN); Qiubin Gao, Beijing (CN); Shaohui Sun, Beijing (CN); Guojun Xiao, Beijing (CN); Rakesh Tamrakar, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 210 days.

(21) Appl. No.: 13/638,586

(22) PCT Filed: May 6, 2011

(86) PCT No.: PCT/CN2011/073717
§ 371 (c)(1),
(2), (4) Date: Sep. 28, 2012

(87) PCT Pub. No.: WO2011/137752
PCT Pub. Date: Nov. 10, 2011

(65) Prior Publication Data
US 2013/0044624 A1 Feb. 21, 2013

(30) Foreign Application Priority Data

May 7, 2010 (CN) .......................... 2010 1 0172043

(51) Int. Cl.
*H04L 12/26* (2006.01)
*H04L 12/28* (2006.01)
(Continued)

(52) U.S. Cl.
CPC ............ *H04L 1/0026* (2013.01); *H04B 7/0632* (2013.01); *H04B 7/0634* (2013.01);
(Continued)

(58) Field of Classification Search
CPC ......... H04L 47/10; H04L 43/50; H04L 41/12; H04L 45/02
USPC ................................................. 370/252, 254
See application file for complete search history.

(56) References Cited

U.S. PATENT DOCUMENTS

| 2009/0052405 A1 | 2/2009 | Ko et al. |
| 2012/0082042 A1* | 4/2012 | Lunttila et al. ................ 370/252 |
| 2013/0058424 A1* | 3/2013 | Enescu et al. ................ 375/267 |

FOREIGN PATENT DOCUMENTS

CN 101272170 A 9/2008

OTHER PUBLICATIONS

PCT International Search Report for PCT Counterpart Application No. PCT/CN2011/073717 containing Communication relating to the Results of the International Search Report, 6 pages, (Aug. 4, 2011).
PCT Written Opinion of the International Searching Authority for Counterpart PCT Application No. PCT/CN2011/073717, 10 pgs., (Aug. 4, 2011).
PCT Notification concerning Transmittal of International Preliminary Report on Patentability (Chapter I of the Patent Cooperation Treaty) for Counterpart PCT Application No. PCT/CN2011/073717, 13 pgs., (Nov. 22, 2012).

(Continued)

*Primary Examiner* — Ronald Abelson
(74) *Attorney, Agent, or Firm* — Blakely, Sokoloff, Taylor & Zafman LLP

(57) ABSTRACT

A method and apparatus for reporting channel state information (CSI) based on a physical uplink shared channel (PUSCH) are used to realize correct reporting of the CSI based on double code books. The method includes the following steps: a reporting mode configuration signaling for the CSI sent from a network side is received, and said reporting mode configuration signaling for the CSI at least carries a designated reporting mode identifier; a first CSI aiming at the whole bandwidth of a system is established according to a reporting type corresponding to said reporting mode identifier; the whole bandwidth of the system is divided into at least two frequency band subclasses, and a second CSI aiming at a designated frequency band subclass is established according to the reporting type corresponding to said reporting mode identifier; and when a reporting indication signaling sent from the network side is received, said first CSI and said second CSI are transmitted to the network side. Therefore, when a user equipment (UE) reports the CSI, a long-term/wideband CSI and a short-term/frequency selective CSI could be considered comprehensively, then a two-level feedback mechanism based on the PUSCH double code books is realized.

4 Claims, 2 Drawing Sheets

(51) Int. Cl.
　　　*H04L 1/00*　　　(2006.01)
　　　*H04B 7/06*　　　(2006.01)
　　　*H04L 5/00*　　　(2006.01)
　　　*H04L 25/03*　　　(2006.01)

(52) U.S. Cl.
　　　CPC ............ *H04B 7/0639* (2013.01); *H04B 7/0643* (2013.01); *H04L 1/0027* (2013.01); *H04L 1/0028* (2013.01); *H04L 5/0053* (2013.01); *H04L 5/0057* (2013.01); *H04L 5/0091* (2013.01); *H04L 25/03343* (2013.01); *H04L 2025/03426* (2013.01)
　　　USPC .......................................... 370/252; 370/254

(56) References Cited

OTHER PUBLICATIONS

European Patent Office Communication enclosing Extended European Search Report for Counterpart EP Application No. 11777173.3, 7 pgs., (Mar. 3, 2014).

Samsung, "Views on the Feedback Framework for Rel. 10", 3GPP TSG RAN WG1 Meeting #61, No. R1-103026, Montreal, Canada, 15 pgs., (May 10-14, 2010).

Nortel, "Enhanced CQI/PMI Feedback Mode to Improve Closed-Loop MIMO Performance", 3GPP TSG RAN WG1#57, No. R1-091926, San Francisco, US, 5 pgs., (May 4-8, 2009).

* cited by examiner

METHOD AND APPARATUS FOR REPORTING CHANNEL STATE INFORMATION (CSI) BASED ON PHYSICAL UPLINK SHARED CHANNEL (PUSCH)

This patent application is a U.S National phase application under 35 U.S.C § 371 of International Application No. PCT/CN2011/073717, filed on May 6, 2011, entitled METHOD AND APPARATUS FOR REPORTING CHANNEL STATE INFORMATION (CSI) BASD ON PHYSICAL UPLINK SHARED CHANNEL (PUSCH), which claims the benefit of Chinese Patent Application No. 201010172043.X, filed with the Chinese Patent Office on May 7, 2010 and entitled "Method and apparatus for reporting CSI on PUSCH", which is hereby incorporated by reference in its entirety.

FIELD

The present invention relates to the field of communications and particularly to a method and apparatus for reporting CSI on a PUSCH.

BACKGROUND

In a point-to-point communication system, if the base station side can obtain Channel State Information (CSI), then it can optimize a modulation scheme, an encoding rate and a spatial distribution characteristic of signal power of a transmitted downlink signal to match the transmitted downlink signal with a channel propagation characteristic to thereby achieve the effects of enhancing the reliability of receiving the signal and of lowering the complexity requirement on a receiving algorithm, and particularly in a multi-user application scenario, the base station side can make a scheduling decision according to its obtained CSI to thereby improve the spectrum efficiency of the system and avoid inter-cell interference.

As currently specified in the Long-Term Evolution (LTE) Rel-8/9, an evolved Node B (eNB) can obtain CSI of a downlink channel according to channel reciprocity or a feedback from a User Equipment (UE), where a codebook-based implicit CSI feedback method is adopted for all of several general transmission modes of a Physical Downlink Shared Channel (PDSCH). In the foregoing protocol, it is specified that in Pre-coding Matrix Indicator (PMI) reporting modes of the transmission modes 4, 5, 6 and 8, the UE measures the downlink channel based upon a Cell-specific Reference Signal (CRS) and reports a Rank Indicator (RI) (which can be supported in the downlink to characterize the number of data streams) and a PMI to the eNB according to its own receiving process algorithm Further, the UE is required to report Channel Quality Information (CQI) of each codeword, where the UE shall calculate the CQI on the assumption that a locally recommended RI/PMI is adopted by the eNB.

As specified in the LTE Rel-8/9, the UE can be configured at an upper layer to report CSI periodically on a Physical Uplink Control Channel (PUCCH) and/or report CSI non-periodically on a Physical Uplink Shared Channel (PUSCH). Referring to Table 1, there are five PUSCH reporting modes for the PUSCH, and the UE adopts a PUSCH reporting mode configured semi-statically in network-side upper-layer signaling. Each PUSCH reporting mode corresponds to one or more PUSCH report types (i.e., CQI/PMI feedback types), and the UE creates corresponding CSI of a PUSCH report type corresponding to the PUSCH reporting mode specified at the network side, where the so-called CSI can be one or any combination of an RI, a PMI and CQI.

TABLE 1

| | | PMI Feedback Type | | |
|---|---|---|---|---|
| | | No PMI | Single PMI | Multiple PMIs |
| PUSCH CQI Feedback Type | Wideband (wideband CQI) | | | Mode 1-2 |
| | UE Selected (sub-band CQI) | Mode 2-0 | | Mode 2-2 |
| | Higher Layer-configured (sub-band CQI) | Mode 3-0 | Mode 3-1 | |

However the existing PUSCH reporting mechanism in the LTE Rel-8/9 is designed for a single-codebook structure and focused on a single-user application scenario, and the PUSCH reporting mechanism will be further optimized in the Rel-10 (established for the LTE-A) to better support a multi-user scenario. As currently already established in the Rel-10, a dual codebook-based PUSCH reporting mechanism is adopted, and in this mechanism, CSI is divided into relatively stable long-term/wideband CSI and short-term/frequency-selective CSI with relatively highly time/frequency-selectivity, and a UE can quantize the two types of CSI with the use of two codebooks on a PUSCH in different feedback cycles.

However the existing single codebook-based CSI report mechanism does not distinguish between long-term/wideband CSI and short-term/frequency-selective CSI and thus is not suitable for the dual codebook-based PUSCH reporting mechanism specified in the Rel-10. Consequently it is desired to provide a new PUSCH reporting mechanism to report accurately long-term/wideband CSI and short-term/frequency-selective CSI.

SUMMARY

Embodiments of the invention provide a method and apparatus for reporting CSI on a PUSCH to report accurately CSI based upon dual codebooks.

Specific technical solutions according to the embodiments of the invention are as follows.

A method for reporting channel state information on an physical uplink shared channel includes:

receiving CSI reporting mode configuration signaling transmitted from the network side, wherein the CSI reporting mode configuration signaling carries at least a specified reporting mode identifier;

creating first CSI for the entire bandwidth of a system according to a report type corresponding to the reporting mode identifier;

dividing the entire bandwidth of the system into at least two subsets of bands and creating second CSI for a specified subset of bands according to the report type corresponding to the reporting mode identifier; and transmitting the first CSI and the second CSI to the network side upon reception of report instruction signaling transmitted from the network side.

An apparatus for reporting channel state information on an physical uplink shared channel includes:

a first communicating unit configured to receive CSI reporting mode configuration signaling transmitted from the network side, wherein the CSI reporting mode configuration signaling carries at least a specified reporting mode identifier;

a processing unit configured to create first CSI for the entire bandwidth of a system according to a report type corresponding to the reporting mode identifier, to divide the entire bandwidth of the system into at least two subsets of bands and to create second CSI for a specified subset of bands according to the report type corresponding to the reporting mode identifier; and a second communicating unit configured to transmit the first CSI and the second CSI to the network side upon reception of report instruction signaling transmitted from the network side.

In the embodiments of the invention, three new reporting modes are added on a PUSCH to support a two-level feedback scheme for dual codebooks, and in the new reporting modes, original report information is redefined as short-term/frequency-selective CSI, and in addition to this, report information characterizing long-term/wideband CSI is further added, and the newly added report information of long-term/wideband CSI can be combined with the original report information of short-term/frequency-selective CSI so that a UE can report CSI taking both long-term/wideband CSI and short-term/frequency-selective CSI into account and further perform a two-level feedback mechanism for dual codebooks on a PUSCH, and also since the reported long-term/wideband CSI and short-term/frequency-selective CSI includes a PMI-1 for a long term/wideband and corresponding CQI and a PMI-2 for a short term/frequency-selectivity and corresponding CQI, SU/MU-MIMO (Single-User MIMO and Multi-User MIMO switching) operations and corresponding Adaptive Modulating and Encoding (AMC) processes can be facilitated.

DETAILED DESCRIPTION OF THE EMBODIMENTS

Referring to the relevant specification of the Rel-10, in order to report CSI accurately based upon dual codebooks, it is proposed in embodiments of the invention a mechanism of reporting CSI on a PUSCH, which is applicable to a precoding process with the use of two levels of codebooks. In this mechanism, a UE can report long-term/wideband CSI (including a PMI and/or corresponding CQI information) to the network side (e.g., an eNB) on a PUSCH and reports short-term/frequency-selective CSI (including a PMI and/or corresponding CQI information) of a specified subset of bands to the network side on a PUSCH.

Preferred embodiments of the invention will be detailed below with reference to the drawings.

Figure 1:
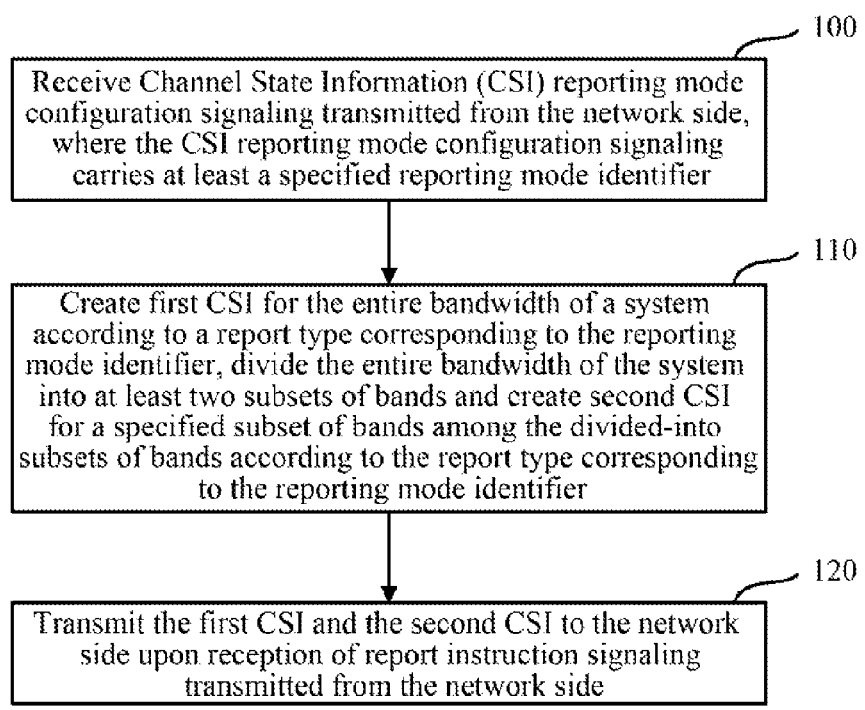
FIG. 1 is a flow chart of a method for a UE to report CSI on a PUSCH according to an embodiment of the invention.

Referring to FIG. 1, a UE in an embodiment of the invention reports CSI on a PUSCH in a specific flow as follows.

An operation 100 is to receive Channel State Information (CSI) reporting mode configuration signaling transmitted from the network side, where the CSI reporting mode configuration signaling carries at least a specified reporting mode identifier (i.e., a reporting mode identifier corresponding to a reporting mode to be adopted).

An operation 110 is to create first CSI for the entire bandwidth of a system according to a report type corresponding to the reporting mode identifier, to divide the entire bandwidth of the system into at least two subsets of bands and to create second CSI for a specified subset of bands among the divided-into subsets of bands according to the report type corresponding to the reporting mode identifier.

Preferably the first CSI and the second CSI respectively includes one or any combination of a Rank Indicator (RI), a Pre-coding Matrix Indicator (PMI) and Channel Quality Information (CQI).

Under the foregoing principle, since none of the existing PUSCH reporting modes supports a two-level feedback scheme for dual codebooks, it is proposed in an embodiment of the invention the introduction of one or more new reporting modes to the existing PUSCH reporting modes. At an upper layer, a Rel-8/9 UE can be configured to use the original modes 1-2, 2-0, 2-2, 3-0 and 3-1, and a Rel-10 UE can be configured to use a new reporting mode. Report information reflecting long-term/wideband CSI and report information reflecting short-term/frequency-selective CSI shall be contained in the new reporting mode. Referring to Table 2, there are given three new PUSCH reporting modes, denoted modes 1-3, 2-3 and 3-3 respectively. In order to support the two-level feedback scheme for dual codebooks, at least one of the three new reporting modes shall be introduced.

TABLE 2

| | | PMI Feedback Type | | | |
|---|---|---|---|---|---|
| | | No PMI | Single PMI | Multiple PMIs | Double CodeBook Based feedback |
| PUSCH CQI Feedback Type | Wideband (wideband CQI) | | | Mode 1-2 | Mode 1-3 |
| | UE Selected (sub-band CQI) | Mode 2-0 | | Mode 2-2 | Mode 2-3 |
| | Higher Layer-configured (sub-band CQI) | Mode 3-0 | Mode 3-1 | | Mode 3-3 |

Based upon the foregoing report mechanism, referring to Table 2, the specified reporting mode identifier can be any of the modes 1-3, 2-3 and 3-3.

In the present embodiment, the so-called specified subset of bands can be all or a part (e.g., a preset number M of subsets of bands) of the divided-into subsets of bands. In an implementation, the subset of bands can be specified in a preset order; or the subset of bands can be specified as reported from the UE by indicating the number of the subset of bands in signaling. Each of the subsets of bands includes several Physical Resource Blocks (PRBs), several sub-bands and/or several bandwidth parts.

An operation 120 is to transmit the first CSI and the second CSI to the network side upon reception of report instruction signaling transmitted from the network side.

Preferably the first CSI and the second CSI is transmitted concurrently to the network side.

Based upon the foregoing embodiment, any of the three new PUSCH reporting modes can be adopted to perform the operation 110, and they will be introduction in details below:

1) In the PUSCH reporting mode 1-3:

The UE obtains a PMI-1 for the entire bandwidth of the system as the first CSI according to a channel characteristic of the entire bandwidth of the system and its own receiving algorithm. For example, assumed a level-1 codebook is structured as $$W\text{-}1 = \begin{pmatrix} W_1 & 0 \\ 0 & W_1 \end{pmatrix}_{8 \times 2},$$

where $W_1$ is a 4×1 vector, and $W_1$ represents the arrival direction of a downlink signal, and the UE can select $W_1$ corresponding to the arrival direction with the strongest signal power, and where the index in the level-1 codebook corresponding to W-1 is the PMI-1. The same principle will apply to similar operations in the following embodiments, and a repeated description thereof will be omitted.

The UE obtains a PMI-2 for each of the subsets of bands (there may be one or more PMIs-2 for each of the subsets of bands) as the second CSI according to a channel characteristic of the subset of bands and the receiving algorithm of the UE itself For example, the UE can select W-2 from a level-2 codebook according to an equivalent channel H×W-1 into which a downlink channel matrix and W-1 are synthesized so that a transmission signal can have a better signal quality after passing a synthesis channel H×W-1×W-2 and undergoing a receiving process of the UE, and where the index in the level-1 codebook corresponding to W-2 is the PMI-2. The same principle will apply to similar operations in the following embodiments, and a repeated description thereof will be omitted.

The UE obtains first CQI of each codeword over the entire bandwidth of the system as the first CSI according to a downlink channel characteristic and the reported PMI-1 and PMI-2 so that the first CQI=CQI (RI, PMI-1, PMI-2), where the UE shall calculate the first CQI by combining the PMIs-2 corresponding to the respective sub-sets of bands respectively with the PMI-1 into a pre-coding matrix. Corresponding parameters will be defined alike in the following formulas, and a repeated description thereof will be omitted.

All the foregoing PMI-1, PMI-2 and first CQI are calculated on the assumption of a downlink channel rank=RI.

2) In the PUSCH reporting mode 2-3:

The UE obtains a PMI-1 for the entire bandwidth of the system as the first CSI according to a channel characteristic of the entire bandwidth of the system and its own receiving algorithm;

The UE selects M subsets of bands and obtains a PMI-2 for the M subsets of bands (there may be one or more PMIs-2 for each of the M subset of bands) as the second CSI according to channel characteristics over the M subsets of bands and its own receiving algorithm; and The UE obtains first CQI of each codeword over the entire bandwidth of the system as the first CSI according to a downlink channel characteristic and the reported PMI-1 so that the first CQI=CQI (RIx, PMI-1, PMI-2x), where RIx represents a certain number below or equal to $R_T$ ($R_T$ represents a rank threshold) and can be fixed or be selected under a certain rule, and PMI-2x represents a $R_T \times RI_X$-dimension pre-coding matrix and can be selected from a codebook under a certain rule or be fixed.

The UE obtains second CQI of each codeword over the M subsets of bands as the second CSI according to the downlink channel characteristic and the reported PMI-1 and PMI-2 so that the second CQI=CQI (RI, PMI-1, PMI-2).

Furthermore, it is preferable to report the first CQI and the second CQI by reporting the CQI of the first codeword and the difference between the CQI of each other codeword than the first codeword and the CQI of the first codeword so as to save a feedback overhead.

All the foregoing PMI-1, PMI-2 and CQI are calculated on the assumption of a downlink channel rank=RI.

3) In the PUSCH reporting mode 3-3:

The UE obtains a PMI-1 for the entire bandwidth of the system as the first CSI according to a channel characteristic of the entire bandwidth of the system and its own receiving algorithm;

The UE obtains a PMI-2 for each of the subsets of bands as the second CSI according to a channel characteristic of the subset of band and the receiving algorithm of the UE itself;

The UE obtains first CQI of each codeword over the entire bandwidth of the system as the first CSI according to a downlink channel characteristic and the reported PMI-1 and PMI-2 so that the first CQI=CQI (RI, PMI-1, PMI-2); and The UE obtains second CQI of each codeword over each of the subsets of bands as the second CSI according to the downlink channel characteristic and the reported PMI-1 and PMI-2 so that the second CQI=CQI (RI, PMI-1, PMI-2).

Furthermore, it is preferable to report the first CQI and the second CQI by reporting the CQI of the first codeword and the difference between the CQI of each other codeword than the first codeword and the CQI of the first codeword so as to save a feedback overhead.

In the foregoing three reporting modes, CQI (a, b, c) represents an assumed channel rank 'a' of the UE, the eNB uses the synthesis pre-coding matrix PM=G(PMI-1, PMI-2) corresponding to PMI-1=b and PMI-2=c, and the function G ( ) represents a function to synthesize two levels of PMIs into a pre-coding matrix.

Based upon the same inventive idea, there is provided in an embodiment of the invention an apparatus for reporting CSI on a PUSCH, and since the apparatus addresses the problem under a similar principle to the method of a UE to report CSI on a PUSCH, reference can be made to the implementation of the method for an implementation of the apparatus, and a repeated description thereof will be omitted here.

Figure 2:
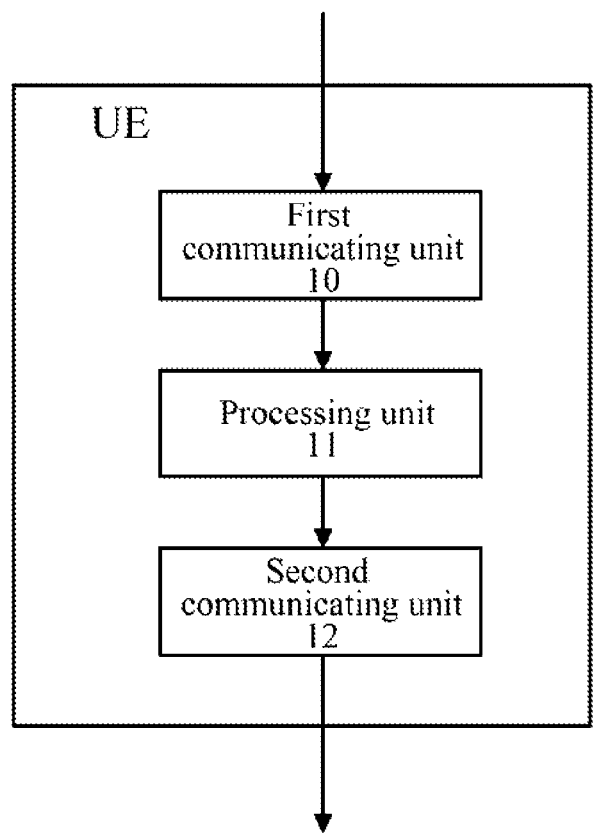
FIG. 2 is a schematic functional diagram of the structure of a UE according to an embodiment of the invention.

Referring to FIG. 2, an apparatus for reporting CSI on a PUSCH (e.g., a UE) in an embodiment of the invention includes a first communicating unit 10, a processing unit 11 and a second processing unit 12.

The first communicating unit 10 is configured to receive CSI reporting mode configuration signaling transmitted from the network side, where the CSI reporting mode configuration signaling carries at least a specified reporting mode identifier;

The processing unit 11 is configured to create first CSI for the entire bandwidth of a system according to a report type corresponding to the reporting mode identifier received by the first communicating unit 10, to divide the entire bandwidth of the system into at least two subsets of bands and to create second CSI for a specified subset of bands among the divided-into subsets of bands according to the report type corresponding to the reporting mode identifier; and The second communicating unit 12 is configured to transmit the first CSI and the second CSI to the network side upon reception of report instruction signaling transmitted from the network side.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

In the embodiments of the invention, three new reporting modes are added over a PUSCH to support a two-level feedback scheme for dual codebooks, and in the new reporting modes, original report information is redefined as short-term/frequency-selective CSI, and in addition to this, report information characterizing long-term/wideband CSI is further added, and the newly added report information of long-term/wideband CSI can be combined with the original report information of short-term/frequency-selective CSI (the combination is reflected in calculation of CQI, that is, CQI shall be calculated taking a PMI-1 and a PMI-2 into account), so that a UE can report CSI taking both long-term/wideband CSI and short-term/frequency-selective CSI into account and further perform the two-level feedback scheme for dual codebooks on a PUSCH, and also since the reported long-term/wideband CSI and short-term/frequency-selective CSI includes a PMI-1 for a long term/wideband and corresponding CQI and a PMI-2 for a short term/frequency-selectivity and corresponding CQI, SU/MU-MIMO operations and corresponding adaptive modulating and encoding processes can be facilitated.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A method for reporting channel state information on a physical uplink shared channel, comprising:
    receiving Channel State Information, CSI, reporting mode configuration signaling transmitted from a network side, wherein the CSI reporting mode configuration signaling carries at least a specified reporting mode identifier;
    creating first CSI for entire bandwidth of a system according to a report type corresponding to the reporting mode identifier, dividing the entire bandwidth of the system into at least two subsets of bands and creating second CSI for a specified subset of bands among divided-into subsets of bands according to the report type corresponding to the reporting mode identifier; and
    transmitting the first CSI and the second CSI to the network side upon reception of report instruction signaling transmitted from the network side,
    wherein the first CSI and the second CSI respectively comprises at least one of a Rank Indicator, RI, a Pre-coding Matrix Indicator, PMI, or Channel Quality Information, CQI,
    wherein the first CSI is created and the second CSI is created by:
        obtaining a first PMI for the entire bandwidth of the system according to a channel characteristic of the entire bandwidth of the system;
        obtaining a second PMI for each of the subsets of bands according to a channel characteristic of the subset of bands; and
        obtaining first CQI of each codeword over the entire bandwidth of the system according to a downlink channel characteristic and the first PMI and second PMI;
    or
        obtaining a first PMI for the entire bandwidth of the system according to a channel characteristic of the entire bandwidth of the system and a local receiving algorithm;
        obtaining a second PMI for a part of the subsets of bands according to channel characteristics of the part of the subsets of bands and the local receiving algorithm;
        obtaining first CQI of each codeword over the entire bandwidth of the system according to a downlink channel characteristic and the first PMI; and
        obtaining second CQI of each codeword over the part of the subsets of bands according to the downlink channel characteristic and the first PMI and second PMI;
    or
        obtaining a first PMI for the entire bandwidth of the system according to a channel characteristic of the entire bandwidth of the system and a local receiving algorithm;
        obtaining a second PMI for each of the subsets of bands according to a channel characteristic of the subset of bands and the local receiving algorithm;
        obtaining first CQI of each codeword over the entire bandwidth of the system according to a downlink channel characteristic and the first PMI and second PMI; and
        obtaining second CQI of each codeword over the each of the subsets of bands according to the downlink channel characteristic and the first PMI and second PMI.

2. The method according to claim 1, wherein the subsets of bands comprise at least two Physical Resource Blocks, PRBs, at least two sub-bands or at least two bandwidth parts.

3. An apparatus for reporting channel state information on a physical uplink shared channel, comprising:

a first communicating unit configured to receive Channel State Information, CSI, reporting mode configuration signaling transmitted from a network side, wherein the CSI reporting mode configuration signaling carries at least a specified reporting mode identifier;

a processing unit configured to create first CSI for entire bandwidth of a system according to a report type corresponding to the reporting mode identifier, to divide the entire bandwidth of the system into at least two subsets of bands and to create second CSI for a specified subset of bands among divided-into subsets of bands according to the report type corresponding to the reporting mode identifier; and a second communicating unit configured to transmit the first CSI and the second CSI to the network side upon reception of report instruction signaling transmitted from the network side, wherein the processing unit is configured:

to create the first CSI for the entire bandwidth of the system according to the report type corresponding to the reporting mode identifier and to create the second CSI for the specified subset of bands according to the report type corresponding to the reporting mode identifier by obtaining a first Pre-coding Matrix Indicator, PMI, for the entire bandwidth of the system according to a channel characteristic of the entire bandwidth of the system, obtaining a second PMI for each of the subsets of bands according to a channel characteristic of the subset of bands and a local receiving algorithm and obtaining first Channel Quality Information, CQI, of each codeword over the entire bandwidth of the system according to a downlink channel characteristic and the first PMI and second PMI; or to create the first CSI for the entire bandwidth of the system according to the report type corresponding to the reporting mode identifier and to create the second CSI for the specified subset of bands according to the report type corresponding to the reporting mode identifier by obtaining a first Pre-coding Matrix Indicator, PMI, for the entire bandwidth of the system according to a channel characteristic of the entire bandwidth of the system and a local receiving algorithm, obtaining a second PMI for a part of the subsets of bands according to channel characteristics of the part of the subsets of bands, obtaining first Channel Quality Information, CQI, of each codeword over the entire bandwidth of the system according to a downlink channel characteristic and the first PMI and obtaining second CQI of each codeword over the part of the subsets of bands according to the downlink channel characteristic and the first PMI and second PMI; or to create the first CSI for the entire bandwidth of the system according to the report type corresponding to the reporting mode identifier and to create the second CSI for the specified subset of bands according to the report type corresponding to the reporting mode identifier by obtaining a first Pre-coding Matrix Indicator, PMI, for the entire bandwidth of the system according to a channel characteristic of the entire bandwidth of the system, obtaining a second PMI for each of the subsets of bands according to a channel characteristic of the subset of bands, obtaining first Channel Quality Information, CQI, of each codeword over the entire bandwidth of the system according to a downlink channel characteristic and the first PMI and second PMI and obtaining second CQI of each codeword over the each of the subsets of bands according to the downlink channel characteristic and the first PMI and second PMI.

4. A user equipment, comprising an apparatus for reporting channel state information on a physical uplink shared channel, the apparatus comprising:

a first communicating unit configured to receive Channel State Information, CSI, reporting mode configuration signaling transmitted from a network side, wherein the CSI reporting mode configuration signaling carries at least a specified reporting mode identifier;

a processing unit configured to create first CSI for entire bandwidth of a system according to a report type corresponding to the reporting mode identifier, to divide the entire bandwidth of the system into at least two subsets of bands and to create second CSI for a specified subset of bands among divided-into subsets of bands according to the report type corresponding to the reporting mode identifier; and a second communicating unit configured to transmit the first CSI and the second CSI to the network side upon reception of report instruction signaling transmitted from the network side, wherein the processing unit is configured:

to create the first CSI for the entire bandwidth of the system according to the report type corresponding to the reporting mode identifier and to create the second CSI for the specified subset of bands according to the report type corresponding to the reporting mode identifier by obtaining a first Pre-coding Matrix Indicator, PMI, for the entire bandwidth of the system according to a channel characteristic of the entire bandwidth of the system, obtaining a second PMI for each of the subsets of bands according to a channel characteristic of the subset of bands and a local receiving algorithm and obtaining first Channel Quality Information, CQI, of each codeword over the entire bandwidth of the system according to a downlink channel characteristic and the first PMI and second PMI; or to create the first CSI for the entire bandwidth of the system according to the report type corresponding to the reporting mode identifier and to create the second CSI for the specified subset of bands according to the report type corresponding to the reporting mode identifier by obtaining a first Pre-coding Matrix Indicator, PMI, for the entire bandwidth of the system according to a channel characteristic of the entire bandwidth of the system and a local receiving algorithm, obtaining a second PMI for a part of the subsets of bands according to channel characteristics of the part of the subsets of bands, obtaining first Channel Quality Information, CQI, of each codeword over the entire bandwidth of the system according to a downlink channel characteristic and the first PMI and obtaining second CQI of each codeword over the part of the subsets of bands according to the downlink channel characteristic and the first PMI and second PMI; or to create the first CSI for the entire bandwidth of the system according to the report type corresponding to the reporting mode identifier and to create the second CSI for the specified subset of bands according to the report type corresponding to the reporting mode identifier by obtaining a first Pre-coding Matrix Indicator, PMI, for the entire bandwidth of the system according to a channel characteristic of the entire bandwidth of the system, obtaining a second PMI for each of the subsets of bands according to a channel characteristic of the subset of bands, obtaining first Channel Quality Information, CQI, of each codeword over the entire bandwidth of the system according to a downlink channel characteristic and the first PMI and second PMI and obtaining second CQI of each codeword over the each of the subsets of bands according to the downlink channel characteristic and the first PMI and second PMI.

* * * * *